May 24, 1949.   V. H. CHRISTEN   2,471,094
STORAGE BATTERY FILLING DEVICE SUPPORT
Filed April 10, 1946
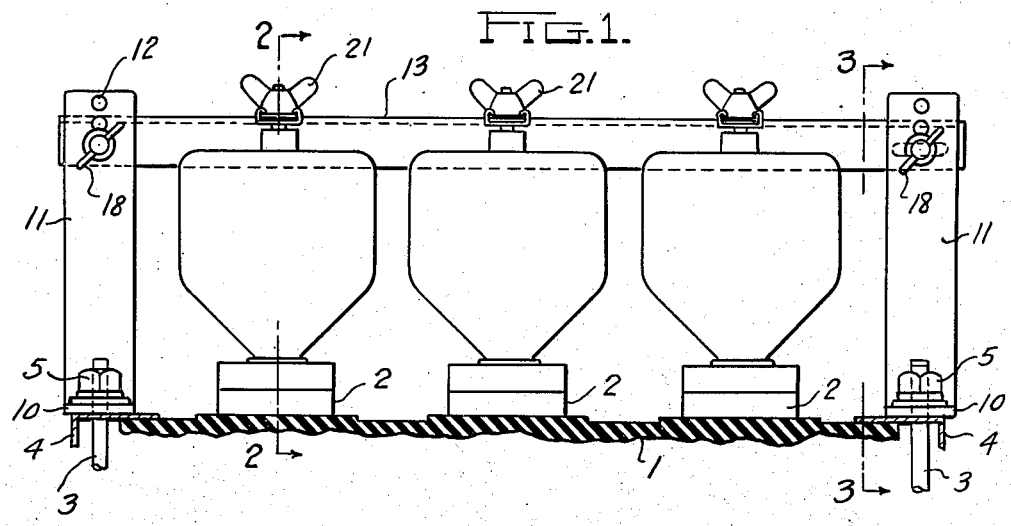
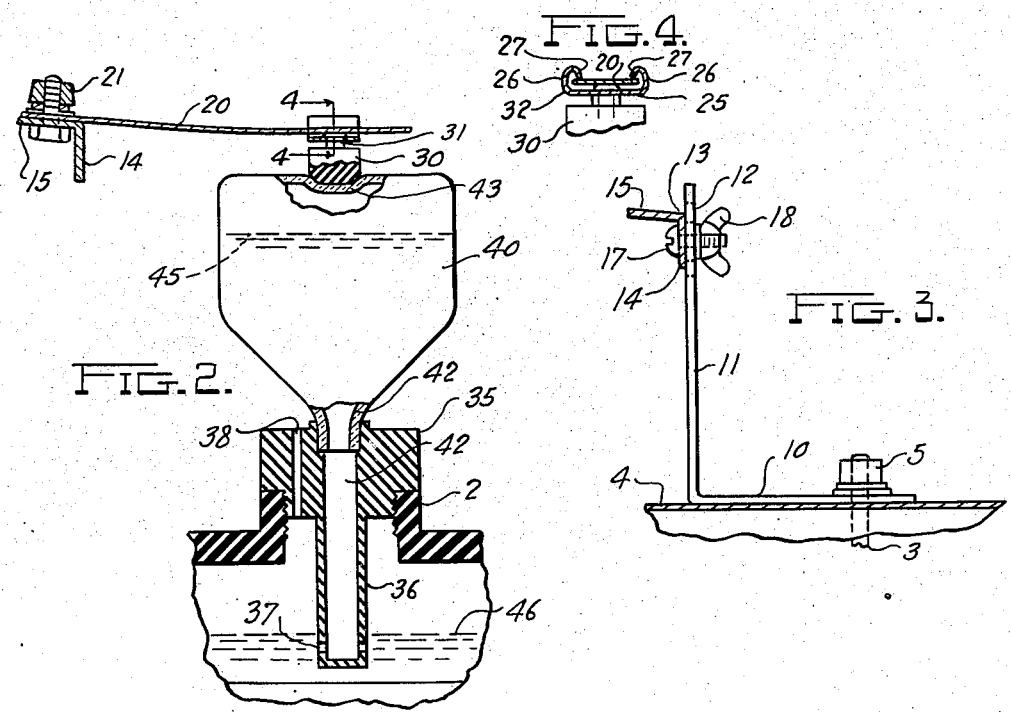
INVENTOR.
Victor H. Christen
BY
ATTORNEYS Patented May 24, 1949

2,471,094

UNITED STATES PATENT OFFICE 2,471,094

STORAGE BATTERY FILLING DEVICE SUPPORT

Victor H. Christen, Sierra Madre, Calif.

Application April 10, 1946, Serial No. 660,881

5 Claims. (Cl. 136—162)

This invention relates to apparatus for automatically maintaining the electrolyte level in the cells of electric storage batteries and particularly for batteries used in automotive vehicles.

An apparatus of this character is shown and claimed in my co-pending application Serial No. 611,569 filed August 20, 1945. The device of the present invention as has been the device shown in the pending application, comprises an inverted container for each cell with means arranged to provide for the flow of water or electrolyte from the container into the cell as required. In application Ser. No. 611,569, filed August 20, 1945, the means for controlling the flow of water is claimed. The same type of water flow controlling means is disclosed in my co-pending applications Ser. No. 687,669, filed August 1, 1946, and 750,801, filed May 27, 1947.

The principal object of the present invention is to provide an effective efficient holding means for the inverted containers. It very often happens that the filler openings of the cells are not in accurate alignment; some times the plug or bushing in the filter opening which, in turn, supports the container is improperly positioned; the height of the several containers may vary for one reason or another, and it is an object of the invention to provide a flexible and reliable means for holding the individual inverted containers in position under these varying conditions. There may also be other variables and in addition thereto the structure in an automotive vehicle is subjected to all sorts of vibrations and jolts and the present invention also aims to provide a mounting or holding device capable of meeting such situations.

A structure made in accordance with the invention is disclosed in the accompanying drawings:

Fig. 1 is a view largely in side elevation, but showing a portion of the battery container in section, illustrating the usual three cells and inverted containers therefor held in position by the mounting means.

Fig. 2 is a sectional view of a somewhat enlarged nature taken substantially on line 2—2 of Fig. 1.

Fig. 3 is a view showing some parts in section and taken substantially on line 3—3 of Fig. 1.

Fig. 4 is a sectional view taken on line 4—4 of Fig. 2 showing a sliding clip arrangement.

In Fig. 1 the container or body of a three cell battery is illustrated at 1, the filler necks for the filler openings of the cells being illustrated at 2. The battery is held in position by suitable "hold down" means here shown as comprising elongated bolts or rods 3, the lower ends of which extend to the bottom of the battery container where they are suitably fastened in a manner not shown herein, while fitting over at least some of the edges of the battery container is a bracket or so-called battery holder 4. The hold down bolts pass through the holder 4 and the assembly made secure as by nuts 5.

The mounting structure comprises brackets of which there are usually two, each being of L-shape as shown in Fig. 3. One leg or arm of the bracket as at 10 is positioned horizontally and it may lie on top of the container 4. The arm 10 is provided with an aperture for the passage of a bolt 3 and the arm 10 is clamped in position by the nut 5. Each arm has an upwardly extending arm 11 which may be vertically disposed as shown in Fig. 3 and each arm is preferably provided with at least one and preferably a plurality of apertures 12 which are arranged in vertically spaced relationship. There is a cross supporting member 13 which is preferably a strip of metal of angular form in cross section as illustrated having a flange 14 which extends in a downward direction and a flange 15 which extends laterally. Preferably, and advantageously, the structure is such that the flange 15 is slidably inclined downwardly toward the filler openings 2 of the battery. When the arms 11 are vertical, as illustrated, thus resulting in a vertical position of the flange 14, the angle of the member 13 is preferably somewhat in excess of 90°. This cross member is secured to the posts or arms 11 by bolts, preferably by bolts 17 and winged nuts 18, and it will be appreciated how the vertical position of the cross member may be varied by the use of selected apertures 12.

The support 13 carries a plurality of spring arms, one for each battery cell. Such a spring arm is shown at 20 and it is secured to the flange 12 in a suitable manner as, for example, by a bolt and winged nut connection 21. These spring arms are preferably simple, flat metal strips of suitable spring steel and when mounted on an inclined flange 15 the spring arms incline in a downward direction. The arms extend laterally, as indicated, and overlie the battery so that the free ends thereof are above the filler openings of the cells.

There is a clip slidably adjustable on each spring arm for holding the inverted container or bottle for each cell. This clip, as shown in Fig. 4, is fashioned from sheet material such as metal, It has a body portion 25 which underlies the spring arm 20 and end portions 26 which extend upwardly therefrom around the edges of the spring arm and the end portions are turned downwardly to provide terminal elements 27 which engage the top surface of the spring arm. There is a contact member 30 preferably and advantageously comprising a rubber button which is attached to a stud 31, the end of which is passed through the body portion 25 of the clip and it may be spun over or riveted to form a head 32 which may engage the underside of the spring arm. This construction is such that the clip preferably grips the spring arm with some tension with the terminal edges 27 frictionally gripping the upper surface of the spring arm and the rivet head 32 or the body 25 of the clip engaging the underside of the spring arm. It will readily be appreciated how the clip may be shifted lengthwise of the spring arm and positioned wherever desired.

The structure for providing the maintenance of an electrolyte is generally illustrated as comprising a bushing of rubber or the like 35 adapted to be placed in a filler opening and having a depending element 36 with one or more openings 37 therein. The plug or bushing may have a vent opening 38. An inverted container such as a glass receptacle of bottle shape and illustrated at 40 is disposed in inverted position with its neck 41 positioned in a passage 42 in the bushing. The bottom wall of the inverted container is preferably provided with a recess 43 for receiving the button 30. It is not necessary here to go into the details of the function of the device so far as maintaining the liquid level is concerned, as this is disclosed and claimed in the above mentioned copending application. Suffice it to say that water, or for that matter electrolyte, is placed in the container, an exemplary level being illustrated by the line 45. This liquid gravitates and fills the passage 42 and depending member 36 and the electrolyte level is maintained at an exemplary level as indicated at 46 in the battery cell. This level of the electrolyte will probably be a little above the aperture or apertures 37 where the battery is in an automotive vehicle because of the sloshing around of the electrolyte, but when the aperture or apertures 37 are exposed, some of the liquid drips from the container into the cell.

It will be appreciated that the button 30 may be of any desirable natural or synthetic rubber or similar substance or any other material for that matter, and likewise, the bushing 35 may be of natural or synthetic rubber or similar material. When the assembly is made the spring arm 20 is flexed thus maintaining a downward pressure on the container so that it is held snugly in position. Where the battery cells are not accurately aligned and thus have different distances from the support 13 the clips may be shifted on their respective spring arms to bring the buttons into proper position. Any tipped position of the container is amply accommodated by the contact of the button 30 in the recess 43. Different heights which may be caused by various battery structures can be readily accommodated by positioning the support member 13 adjustably by the means of the several apertures 12. It will be understood that some batteries are relatively compact with the cells closely positioned in transverse relationship as indicated in Fig. 1 while others are of elongated form with the cells disposed in end to end relationship. The only variation required to accommodate these different battery structures is that of providing a different length in the support member 13.

When this structure is to be incorporated in an automobile, or with a battery otherwise located, the supporting structure and the containers may be obtained as a packaged unit. It will readily be seen how the structure may be easily and quickly applied by mounting the brackets through the means of the hold down nuts 5 and the supporting member 13 may then be quickly mounted by the winged nuts 18 and the spring arms 20 quickly mounted on the bracket through the means of the winged nuts 21. Thereafter it is only necessary to slip the clips onto the spring arms. In order to mount a receptacle the operator may lift the spring arm by placing his finger under the free end thereof. The removal of a container to re-fill it, is accomplished in like manner, namely, by lifting the free end of the spring arm and then removing the container, the same being replaced after it is filled with the proper amount of liquid.

I claim:

1. An apparatus for holding inverted containers of liquid in position relative to the filler openings of the cells of an electric storage battery for the maintenance of the level of the electrolyte therein, wherein there are bolts for holding the battery in place, comprising brackets substantially of L shape having substantially horizontal arms with apertures therein for receiving said bolts so that said brackets are secured thereby, said brackets having upwardly extending arms, a support carried by the arms in a position above and laterally removed from the filler openings, a spring arm for each cell, means for attaching one end of each arm to the support so that the arms project from the support and overlie the containers for the cells, a clip constructed to be slidably mounted on each arm for adjustable movement lengthwise thereof, and a button-like member of rubber material mounted on each clip for engaging the upper part of an inverted container under the action of the spring arm to hold the container in position.

2. An apparatus for holding inverted containers of liquid in position relative to the filler openings of the cells of an electric storage battery for the maintenance of the level of the electrolyte therein, wherein there is means for holding the battery in place, comprising brackets constructed to be mounted upon and secured in position relative to the battery by said means, said brackets having arms extending upwardly from the top of the battery, a support carried by the arms in a position above and laterally removed from the filler openings, a flat spring arm for each cell, means for attaching one end of each spring arm to the support so that the arms project from the support and overlie the containers for the cells, a clip constructed to be slidably mounted on each spring arm for adjustable movement lengthwise thereof, and an engaging member mounted on each clip for engaging the upper part of an inverted container under the action of the spring arm to hold the container in position.

3. An apparatus for holding inverted containers of liquid in position relative to the filler openings of the cells of an electric storage battery for the maintenance of the level of the electrolyte therein, wherein there is means for holding the battery in place, comprising brackets constructed to be mounted upon and secured in position relative to the battery by said means, said brackets having arms extending upwardly from the top of the battery, a support carried by the arms in a position above and laterally removed from the filler openings, said support having an upper surface inclined downwardly in the direction of the cells, a spring arm for each cell, means for attaching one end of each spring arm to the top of the support so that the arms project from the support in a downwardly inclined manner and overlie the containers for the cells, a clip constructed to be slidably mounted on each spring arm for adjustable movement lengthwise thereof, and an engaging member mounted on each clip for engaging the upper part of an inverted container under the action of the spring arm to hold the container in position.

4. An apparatus for holding inverted containers of liquid in position relative to the filler openings of the cells of an electric storage battery for the maintenance of the level of the electrolyte therein, wherein there is means for holding the battery in place, comprising brackets constructed to be mounted upon and secured in position relative to the battery by said means, said brackets having arms extending upwardly from the top of the battery, said arms each having a plurality of openings therein, a support extending across from one bracket to another, bolts with winged nuts for securing the support to the brackets whereby the same may be adjustably positioned by selecting the holes in the brackets, said support lying above and laterally removed from the cells, a spring arm for each cell, means for attaching one end of each arm to the support so that the arms project from the support in a position overlying the cells, a clip constructed to be slidably and adjustably mounted on each spring arm, and an engaging member on each clip for engaging an inverted container under the spring action of the arm to hold the container in position.

5. An apparatus for holding inverted containers of liquid in position relative to the several filler openings of the cells of an electric storage battery, which filler openings are arranged in a line, for the maintenance of the level of the electrolyte therein comprising, a pair of brackets, a cross support for attachment to the brackets in a position above and laterally removed from the cells, said cross support substantially paralleling the line of filler openings, a plurality of flat spring arms, one for each cell, means for securing the spring arms to the support so that the spring arms project laterally over the cells, a clip member for slidable engagement on each spring arm, and an engaging member on each clip member for engaging a container to hold it in position relative to its corresponding filler opening.

VICTOR H. CHRISTEN.

REFERENCES CITED

The following references are of record in the file of this patent:

UNITED STATES PATENTS

| Number | Name | Date |
|---|---|---|
| 1,361,437 | Blau | Dec. 7, 1920 |
| 1,362,832 | Angell | Dec. 21, 1920 |
| 2,139,476 | Townsend | Dec. 6, 1938 |